(12) United States Patent
Beijbom

(10) Patent No.: US 6,797,123 B2
(45) Date of Patent: Sep. 28, 2004

(54) DEVICE AT DISTILLERS ADAPTED TO DISTILL SOLVENTS FOR RECOVERY OF PURE SOLVENT FROM IMPURE SOLVENT

(75) Inventor: Peter Beijbom, Lund (SE)

(73) Assignee: Hedson Technologies AB, Arlov (SE)

(*) Notice: Subject to any disclaimer, the term of this patent is extended or adjusted under 35 U.S.C. 154(b) by 0 days.

(21) Appl. No.: 09/741,216

(22) Filed: Dec. 20, 2000

(65) Prior Publication Data

US 2002/0074220 A1 Jun. 20, 2002

(51) Int. Cl.⁷ .............................. B01D 1/30; B01D 3/02
(52) U.S. Cl. .................. 202/170; 202/267.1; 202/164; 203/86; 203/100; 159/DIG. 15; 159/DIG. 41
(58) Field of Search ............................. 202/170, 267.1, 202/164, 242; 203/86, 100; 159/DIG. 15, DIG. 41, 47.1; 134/105, 109

(56) References Cited

U.S. PATENT DOCUMENTS

| 224,075 | A | * | 2/1880 | Clark | 202/170 |
| 515,889 | A | * | 3/1894 | Todd | 202/170 |
| 840,955 | A | * | 1/1907 | Pride | 202/170 |
| 1,017,518 | A | * | 2/1912 | Edgerton | 202/170 |
| 1,112,980 | A | * | 10/1914 | Castona | 202/170 |
| 3,593,729 | A | * | 7/1971 | Goldware | 134/103 |
| 4,323,429 | A | * | 4/1982 | Hoover | 202/83 |
| 4,536,256 | A | * | 8/1985 | Pastor | 202/267.1 |
| 4,830,710 | A | * | 5/1989 | Thompson | 202/176 |
| 5,246,549 | A | * | 9/1993 | Heil | 202/267.1 |

OTHER PUBLICATIONS

A brochure describing solvent distillers with inner flexible containers, dated Rev. Jan. 2001.

* cited by examiner

Primary Examiner—Virginia Manoharan
(74) Attorney, Agent, or Firm—Tarolli, Sundheim, Covell & Tummino L.L.P.

(57) ABSTRACT

The present invention relates to a device for a distiller adapted to distil solvents for recovery of pure solvent from impure solvent, the solvent (2) being used for washing away residues of paint from spray guns. The distiller (1) includes an outer container (5) with a boiling chamber (8) which at the top has an opening (9) which can be tightly closed by a cover (10) and a flexible inner container (13) is provided in the boiling chamber (8), the flexible inner container (13) containing impure solvent to be distilled. A pipe means (20) is placed beside the flexible inner container (13) in order to allow solvent steam (7a), which is generated by boiling solvent in a lower space (19) beneath the flexible inner container (13), to pass from the lower space (19) into an upper space (16) having an outlet (17) and located above the flexible inner container (13) for preventing the solvent steam (7a) from lifting the flexible inner container (13) in the boiling chamber (8).

6 Claims, 3 Drawing Sheets

DEVICE AT DISTILLERS ADAPTED TO DISTILL SOLVENTS FOR RECOVERY OF PURE SOLVENT FROM IMPURE SOLVENT

The present invention relates to a device at distillers adapted to distil solvents for recovery of pure solvent from impure solvent, said solvent being used e.g. for washing away residues of paint from spray guns, wherein the distiller comprises an outer container with a boiling chamber which at the top has an opening which can be tightly closed by means of a cover, wherein a flexible inner container is provided in the boiling chamber, said flexible inner container containing impure solvent to be distilled, and wherein a heating device is provided to heat the impure solvent in the flexible inner container such that it is boiled and solvent steam thereby is generated in an upper space of the boiling chamber, said solvent steam flowing out from said upper space through at least one outlet and into a condensing device which is provided to condense the solvent steam to pure solvent.

At distillers of the abovementioned type, experience shows that solvent might accumulate in the boiling chamber beneath the flexible inner container. During heating and boiling of the solvent in the flexible inner container, said solvent is heated and boiled also beneath said flexible inner container. The solvent steam generated beneath the flexible inner container when the solvent beneath it is brought to boil, might under unfortunate circumstances be prevented by the flexible inner container from flowing up into the upper space of the boiling chamber and out through the outlet therefrom to the condensing device. Hereby, there is a risk that the solvent steam beneath the flexible inner container lifts said flexible inner container such that it obstructs the outlet from the upper space of the boiling chamber to the condensing device. Furthermore, the flexible inner container might be pressed out between upper parts of the distiller and its cover. It has been noticed that this might lead to that hot solvent is pressed out from the boiling chamber at the top thereof and spread around the distiller, with the risk for extensive damages as a result, which of course is unacceptable.

The object of the present invention is to eliminate this danger by simple means.

Since the device has been given said characterizing features, it is achieved that solvent steam generated beneath the flexible inner container is fed past said flexible inner container at its side to the upper space of the boiling chamber and out through the outlet to the condensing device. Thus, the risk for said solvent steam lifting the flexible inner container is eliminated and thereby, the risk for solvent being pressed out at the top of the boiling chamber.

BRIEF DESCRIPTION OF THE DRAWINGS

The invention will be further described below with reference to the accompanying drawings, in which.

Figure 1:
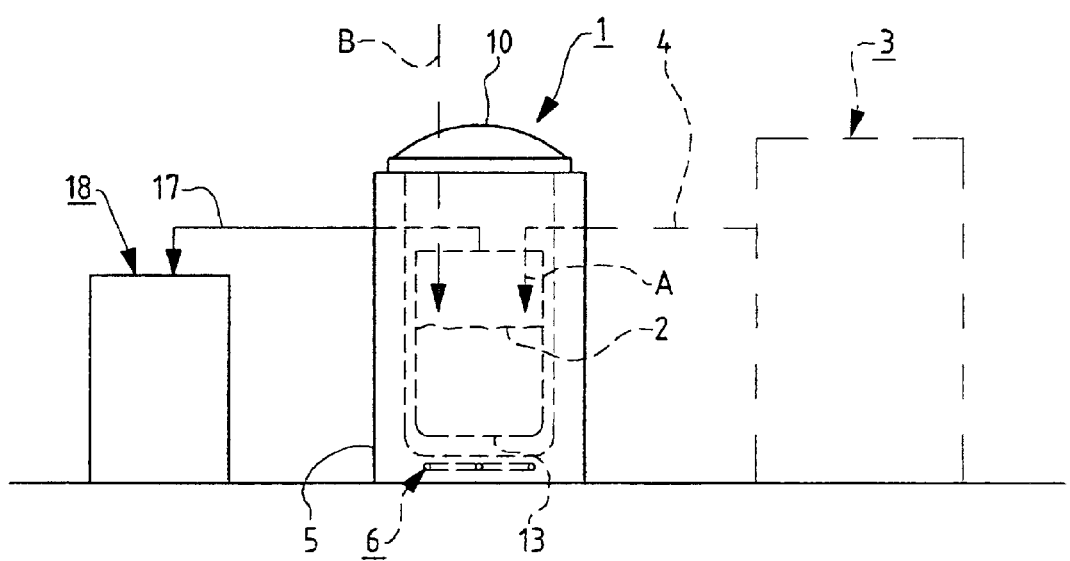
FIG. 1 is a side view of a distiller and a condensing device connected thereto.

The drawing figures illustrate a distiller 1 for distilling a solvent 2 in order to recover pure solvent from impure solvent. The distiller 1 may preferably be used for distilling a solvent 2, e.g. paint thinner, which has been used for washing away residues of paint from spray guns (not shown) in a washing device 3 provided therefor and illustrated with broken lines in FIG. 1. Such a washing device 3 may be connected to the distiller 1 through a conduit 4 which feeds impure solvent 2 into the distiller 1, said feeding being marked with an arrow A. Alternatively, impure solvent 2 from the washing device 3 or any other device can be poured into the distiller 1, which in FIG. 1 is marked with an arrow B.

The distiller 1 comprises an outer container 5 with a heating device 6 which is adapted to heat impure solvent 2 in the distiller 1 such that it is brought to boil and such that solvent steam 7 is thereby generated. The outer container 5 of the distiller 1 includes a boiling chamber 8 with an opening 9 at the top. The opening 9 can be tightly sealed by means of a cover 10 which in closing position, through a sealing means 11, engages an upper edge 12 of the outer container 5.

The cover 10 is sealed such that it intentionally lightens and releases steam if a certain predetermined presure is exceeded in the boiling chamber 8.

Inside the boiling chamber 8 there is provided a flexible inner container 13 of plastic material or any other suitable material. The flexible inner container 13 is at the top fastened to the inner walls 14 of the outer container 5 by means of a retaining ring 15. This ring is located within upper parts of the flexible inner container 13 and clamps said upper parts against the inner walls 14.

Figure 2:
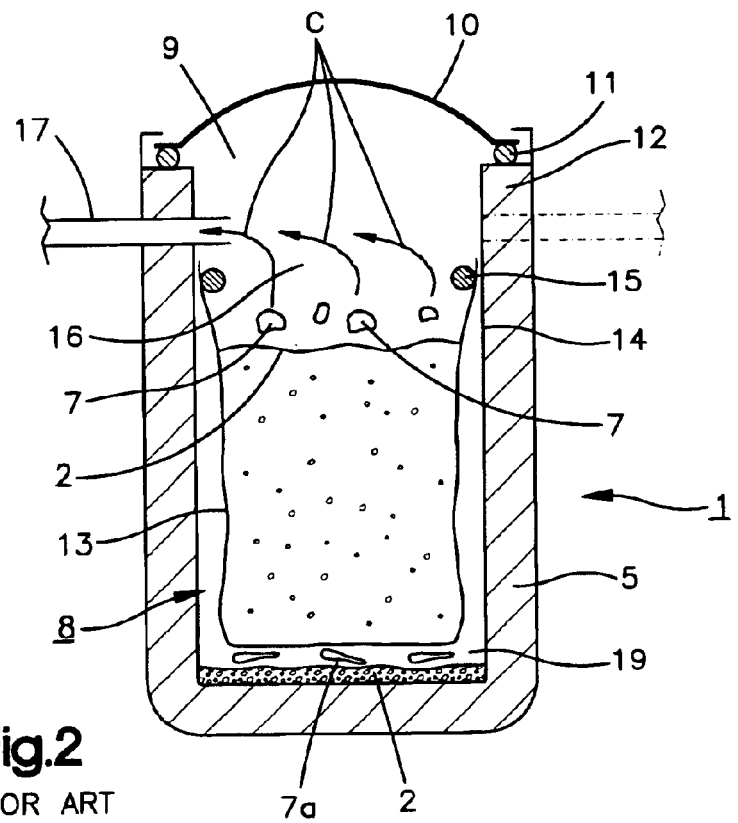
FIG. 2 is a schematic sectional view of a distiller of prior art type.
Figure 4:
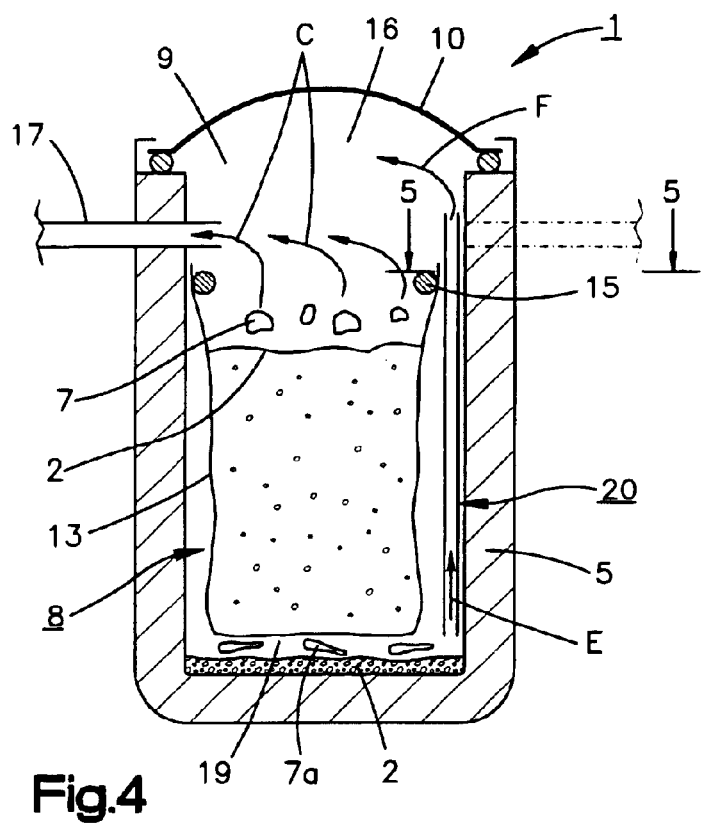
FIG. 4 is a schematic sectional view of a distiller with a device according to the invention.

Impure solvent 2 is fed to the flexible inner container 13 either through the conduit 4 or through the opening 9 and boiled through heating to generate the solvent steam 7 in an upper space 16 of the boiling chamber 8. This solvent steam 7 is fed through at least one outlet 17 to a condensing device 18, in which they are condensed to liquid solvent. The direction of flow of the solvent steam 7 through and out of the upper space 16, is illustrated with arrows C in FIGS. 2, 4 and 6.

Figure 3:
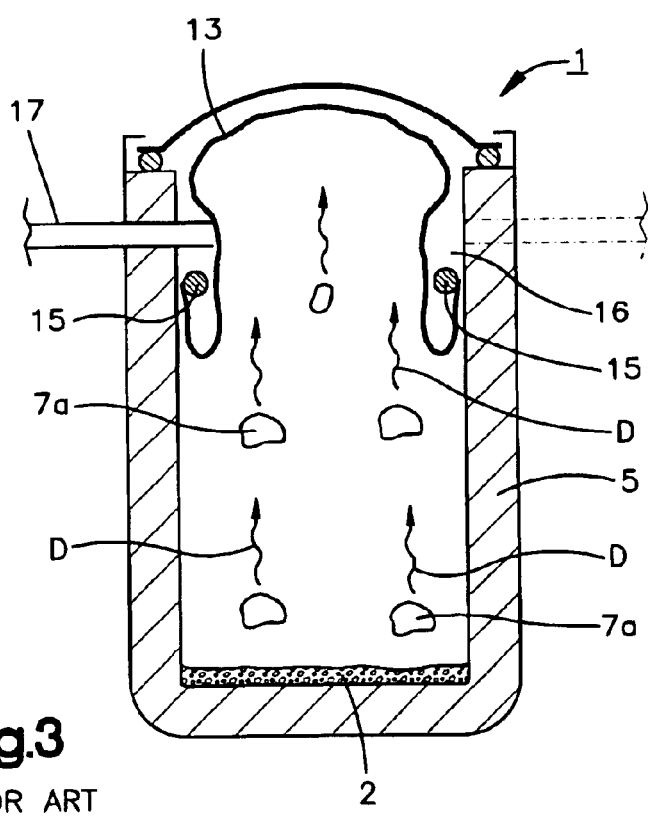
FIG. 3 is a schematic sectional view of a distiller of prior art type having a flexible inner container in a raised, unacceptable condition.

Experience shows that a certain amount of solvent 2 accumulates in a lower space 19 in the boiling chamber 8 and this solvent 2 is also brought to boil and thereby emit solvent steam 7l. Since the flexible inner container 13 under unfortunate circumstances might obstruct the path for the solvent steam 7a and prevent to from flowing up into the upper space 16 and out though the outlet 17, the solvent steam 7a flowing upwards might life the flexible inner container 13, which is illustrated with arrows D in FIG. 3.

Since this is unacceptable, at least one pipe means 20 or a corresponding member is located in the boiling chamber 8 or adjacent said boiling chamber and beside the flexible inner container 13 in order to allow solvent steam 7a to pass from the lower space 19 to the upper space 16 and therefrom out through the outlet 17, whereby said solvent steam 7a is prevented from lifting the flexible inner container 13 in the boiling chamber 8. Thus, the solvent steam 7a flows into the pipe means 20 down below (arrow E) and out of the pipe means 20 at the top thereof (arrow F) and into the upper space 16.

Figure 5:
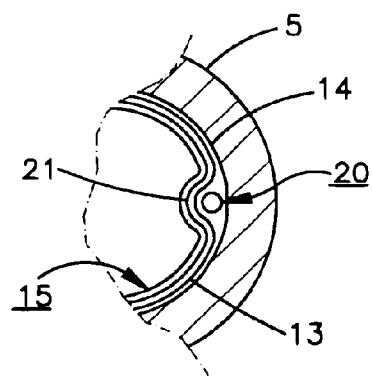
FIG. 5 is a section V—V through a part of the distiller of FIG. 4.

As is apparent from FIG. 5, the retaining ring 15 preferably comprises an inwardly bent part such that it makes room for said pipe means 20.

Figure 6:
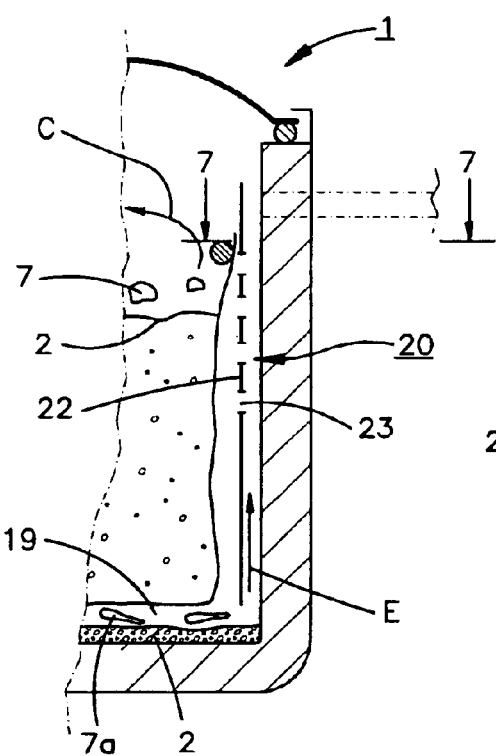
FIG. 6 is a schematic sectional view of a distiller having an alternative embodiment of the device according to the invention.

As is shown in FIG. 6, the pipe means 20 may comprise a part 22 having a V-profile and holes 23. Said part 22 can be attached to portions 24 of the inner walls 14 and together therewith define the pipe means 20. Said part 22 may run the entire way from the bottom of the boiling chamber 8 to the top thereof and it may consist of stainless material and be punched.

Figure 7:
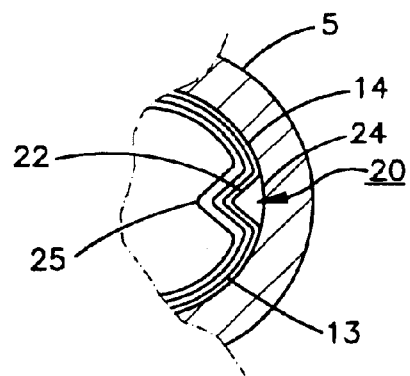
FIG. 7 is a section VII—VII through a part of the distiller of FIG. 6.

As is illustrated in FIG. 7, the retaining ring 15 may include an inwardly directed part 25 which is designed to make room for the pipe means 20 shown in FIG. 6.

The invention described above may vary within the scope of the subsequent claims regarding its construction and function. It should be mentioned that said solvent does not need to be used for washing spray guns, but may be used for washing quite different objects.

What is claimed is:

1. In a solvent distiller for recovery of purified solvent from impure solvent, the impure solvent containing residues of paint, the distiller comprising an outer container defining a boiling chamber, the outer container including an opening, a cover closing the opening, a flexible inner container located in the boiling chamber and containing impure solvent to be distilled, the flexible inner container being made of a flexible material, the flexible inner container and the outer container defining a lower space within the boiling chamber, the cover, the flexible inner container and the outer container defining an upper space located above the impure solvent, and a heating device for heating the impure solvent in the flexible inner container to cause the impure solvent to boil and to generate solvent steam in the upper space, the upper space having at least one outlet for directing the solvent steam from the upper space, and a condensing device for receiving the solvent steam from the at least one outlet and for condensing the solvent steam to form purified liquid solvent, wherein the improvement comprises:
   means located between the flexible inner container and an inner surface of the outer container and extending from the lower space to the upper space for preventing solvent steam, generated by heated solvent trapped in the lower space, from lifting the flexible inner container in the boiling chamber by transporting the solvent steam from the lower space to the upper space and to the at least one outlet,
   said means comprising a pipe having an inlet spaced apart from the bottom of the boiling chamber.

2. The solvent distiller according to claim 1 wherein the flexible inner container is fastened to an inner wall of the outer container by a retaining ring, the retaining ring including an inwardly directed part for allowing passage of the pipe means through the retaining ring from the lower space to the upper space.

3. The solvent distiller according to claim 1 wherein the inlet is the first terminal end of the pipe, the first terminal end of the pipe being a free terminal end.

4. The solvent distiller according to claim 3 wherein the pipe has a second terminal end which is a free terminal end.

5. In a solvent distiller for recovery of purified solvent from impure solvent, the impure solvent containing residues of paint, the distiller comprising an outer container defining a boiling chamber, the outer container including an opening, a cover closing the opening, a flexible inner container located in the boiling chamber and containing impure solvent to be distilled, the flexible inner container being made of a flexible material, the flexible inner container and the outer container defining a lower space within the boiling chamber, the cover, the flexible inner container and the outer container defining an upper space located above the impure solvent, and a heating device for heating the impure solvent in the flexible inner container to cause the impure solvent to boil and to generate solvent steam in the upper space, the upper space having at least one outlet for directing the solvent steam from the upper space, and a condensing device for receiving the solvent steam from the at least one outlet and for condensing the solvent steam to form purified liquid solvent, wherein the improvement comprises:
   a pipe means located between the flexible inner container and the outer container and extending from the lower space to the upper space for transporting solvent steam from the lower space to the upper space and to the at least one outlet to prevent the solvent steam generated in the lower space from lifting the flexible inner container in the boiling chamber, the solvent steam being generated by heated solvent trapped in the lower space, the pipe means having an inlet spaced apart from a bottom of the outer container,
   the pipe means comprises an elongated profile with holes attached to the outer container between the outer container and the flexible inner container, the profile and the outer container defining a passageway for transporting the solvent steam, generated by heating impure solvent trapped in the lower space, from the lower space to the upper space.

6. The solvent distiller according to claim 5 wherein the elongated profile of the pipe means is v-shaped.

* * * * *